(12) United States Patent
Iliadis et al.

(10) Patent No.: US 10,585,614 B2
(45) Date of Patent: Mar. 10, 2020

(54) SUBTIER-LEVEL DATA ASSIGNMENT IN A TIERED STORAGE SYSTEM

(71) Applicant: International Business Machines Corporation, Armonk, NY (US)

(72) Inventors: Ilias Iliadis, Rueschlikon (CH); Yusik Kim, Zwolle (NL); Slavisa Sarafijanovic, Adliswil (CH); Vinodh Venkatesan, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 15/297,750

(22) Filed: Oct. 19, 2016

(65) Prior Publication Data
US 2018/0107425 A1    Apr. 19, 2018

(51) Int. Cl.
*G06F 3/06* (2006.01)
(52) U.S. Cl.
CPC .......... *G06F 3/0647* (2013.01); *G06F 3/0613* (2013.01); *G06F 3/0685* (2013.01)
(58) Field of Classification Search
CPC ........ G06F 3/06; G06F 3/0647; G06F 3/0613; G06F 3/0685
See application file for complete search history.

(56) References Cited

U.S. PATENT DOCUMENTS

| | | | |
|---|---|---|---|
| 7,849,180 B2 | 12/2010 | Sawyer et al. | |
| 8,583,838 B1 * | 11/2013 | Marshak | G06F 3/061 |
| | | | 710/16 |
| 9,477,431 B1 * | 10/2016 | Chen | G06F 3/0689 |
| 9,785,353 B1 * | 10/2017 | Marshak | G06F 3/064 |
| 2013/0283225 A1 | 10/2013 | Alpert et al. | |
| 2014/0229447 A1 | 8/2014 | Aslot et al. | |

(Continued)

OTHER PUBLICATIONS

Ilias Iliadis, Jens Jelitto, Yusik Kim, Slavisa Sarafijanovic "ExaPlan: Queueing-Based Data Placement and Provisioning for Large Tiered Storage Systems" Modeling, Analysis and Simulation of Computer and Telecommunication Systems (MASCOTS), 2015 IEEE 23rd International Symposium, Oct. 5-7, 2015.

(Continued)

*Primary Examiner* — Masud K Khan
(74) *Attorney, Agent, or Firm* — Harrington & Smith

(57) ABSTRACT

An embodiment is directed to a method for determining an assignment of data to be stored on at least one storage tier i of a plurality of storage tiers of a tiered storage system. The method including, for the at least one storage tier i, steps of accessing storage device characteristics of the at least one storage tier i of the plurality; based on the accessed storage device characteristics, splitting the at least one storage tier i into $N_i$ storage subtiers of the at least one storage tier i, the $N_i$ storage subtiers having respective storage device characteristics; and based on characteristics of data to be stored on the tiered storage system and the respective storage device characteristics of the $N_i$ storage subtiers, determining an assignment of data to be stored on each of the $N_i$ storage subtiers. Embodiments are directed to related methods, systems and computer program products.

19 Claims, 7 Drawing Sheets

(56) References Cited

U.S. PATENT DOCUMENTS

2016/0048355 A1    2/2016  Iliadis et al.
2016/0253382 A1*   9/2016  Shadmon .......... G06F 17/30315
                                                          707/718

OTHER PUBLICATIONS

Lipeng Wan; Dept. of Electr. Eng. & Comput. Sci., Univ. of Tennesse, Knoxville, TN USA; Zheng Lu; Qing Cao; Feiyi Wang "SSD-Optimized Workload Placement with Adaptive Learning and Classification in HPC Enviroments" 2014 30th Symposium on Mass Storage Systems and Technologies (MSST), Jun. 2-6, 2014.

* cited by examiner

SUBTIER-LEVEL DATA ASSIGNMENT IN A TIERED STORAGE SYSTEM

BACKGROUND

The invention relates in general to the field of computerized methods for determining an assignment of data to be stored on storage tiers of a tiered storage system, as well as related storage systems and computer programs. In particular, it is directed to a method to determine data assignments at a subtier-level.

Tiered storage relies on assigning different categories of data to various types of storage media in order to reduce the global storage cost. A tiered storage system usually relies on policies that assign most frequently accessed data to high-performance storage tiers, whereas rarely accessed data are stored on low-performance (cheaper) storage tiers.

The read/write performance of a data storage system, typically estimated in terms of throughput or mean response time for a request, depends on the characteristics of the storage devices (e.g., latency and bandwidth), the nature of the input/output (I/O) workload (e.g., the frequency and size of I/O requests to each data object), and on the assignment of data objects across the storage devices. Given a set of storage devices and an I/O workload, the performance of the system depends on the data assignment. Therefore, a carefully chosen data assignment can lead to enhanced performance, whereas improper data assignment can result in poor performance and wastage of storage resources. That is, optimizing data assignment may improve the performance of existing storage resources, under a given workload.

Tiered storage systems are known, which ensure that the amount of data stored on each device of a tier is balanced. Other systems use iterative heuristic approaches to address this problem using IOPS (I/Os per second) as a performance metric by assuming that each I/O request is of a fixed size. Other methods employ load-balancing mechanisms to ensure that the load on each storage device (the load defined as the expected percentage of time a device is busy serving I/O requests) is the same across all devices. Many load-balancing algorithms exist, such as the Greedy-Scheduling algorithm and the Longest Processing Time (LPT) algorithm.

SUMMARY

According to a first aspect, the present invention is embodied as a method for determining an assignment of data to be stored on at least one storage tier i of a plurality of storage tiers of a tiered storage system. The method comprises, for said at least one storage tier i, steps of: accessing storage device characteristics of said at least one storage tier i of said plurality; based on the accessed storage device characteristics, splitting said at least one storage tier i into $N_i$ storage subtiers of said at least one storage tier i, said $N_i$ storage subtiers having respective storage device characteristics; and based on characteristics of data to be stored on the tiered storage system and the respective storage device characteristics of the $N_i$ storage subtiers, determining an assignment of data to be stored on each of the $N_i$ storage subtiers.

According to another aspect, the invention is embodied as a method for storing data on at least one storage tier i of a plurality of storage tiers of a tiered storage system. This method comprises all the steps of the above method for determining an assignment of data and, in addition, a step of storing data on each of the $N_i$ storage subtiers according to the assignment of data determined.

According to still another aspect, the invention is embodied as a tiered storage system. The system comprises a data assignment unit for determining an assignment of data to be stored on at least one storage tier i of a plurality of storage tiers of the tiered storage system. This data assignment unit is configured to perform steps of the above method for determining an assignment of data.

According to a final aspect, the invention is embodied as a computer program product for determining an assignment of data to be stored on at least one storage tier i of a plurality of storage tiers of a tiered storage system. This computer program product comprises a computer readable storage medium having program instructions embodied therewith. The program instructions are executable by one or more processors of one or more entities, to cause to take steps according to the above method for determining an assignment of data.

Systems, methods and computer program products embodying the present invention will now be described, by way of non-limiting examples, and in reference to the accompanying drawings.

BRIEF DESCRIPTION OF SEVERAL VIEWS OF THE DRAWINGS

The accompanying drawings show simplified representations of devices or parts thereof, as involved in embodiments. Similar or functionally similar elements in the figures have been allocated the same numeral references, unless otherwise indicated.

DETAILED DESCRIPTION OF EMBODIMENTS OF THE INVENTION

Techniques described herein relate to tiered storage systems. Of interest here is a method described in US2016048355, which discloses a method for determining a number of storage devices for each of a plurality of storage tiers of a tiered storage system and for determining an assignment of data to be stored on the plurality of storage tiers. This method includes the following steps: receiving a first set of parameters indicating characteristics of the data to be stored and indicating characteristics of the storage devices, determining a second set of parameters indicating classifier unit configuration parameters, determining an assignment of the data to the plurality of storage tiers based on the first set of parameters and the second set of parameters, receiving a cost value, determining a number of storage devices for each of the plurality of storage tiers based on the determined assignment and the received cost value and a performance metric, estimating a value of the performance metric based on the determined assignment and the determined number of storage devices, determining the second set of parameters, providing the second set of parameters to the reconfigurable classifier unit, and adapting the assignment of the data to the plurality of storage tiers based on the first set of parameters and the second set of parameters.

Figure 1:
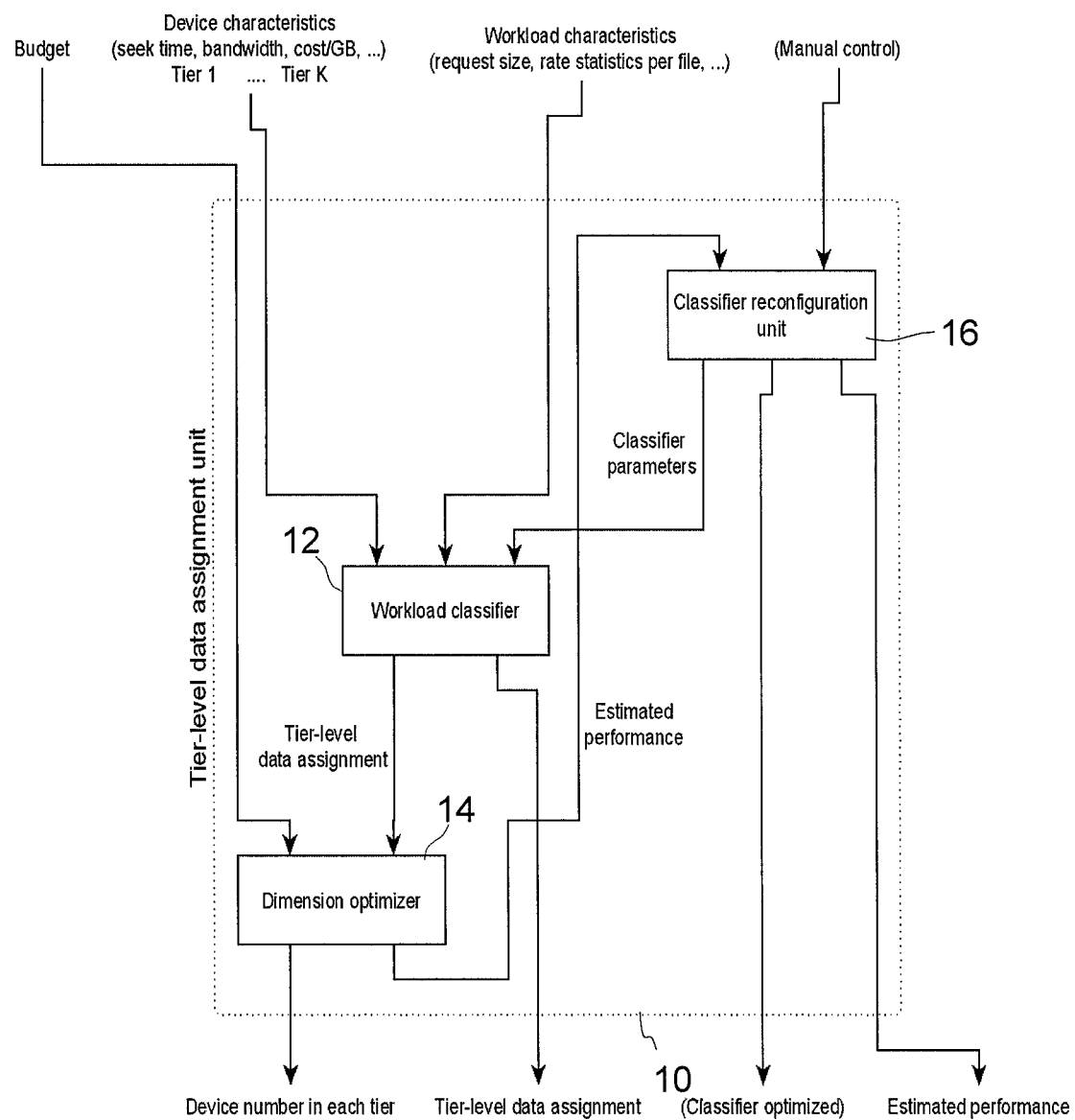
FIG. 1 is a flowchart depicting modules or units of a storage system and steps of a method for determining an assignment of data across a plurality of storage tiers of a tiered storage system.

FIG. 1 is a simplified block diagram related to the aforementioned method described in US2016048355, wherein FIG. 1 includes a tier-level data assignment unit 10; a workload classifier 12; a dimension optimizer 14; and a classifier configuration unit 16.

As noted in the background section, some tiered storage systems rely on balancing the amount of data stored on each device of a tier. However, as it may be realized, such an approach does not guarantee that the I/O workload also gets evenly distributed across all devices. Next, using IOPS (I/Os per second) as a performance metric (assuming requests of fixed size) may not be effective, inasmuch as, requests can actually be of vastly different sizes in practice. Finally, concerning load-balancing algorithms, present Inventors have realized, using queuing theory models as well as simulations, that balancing the load across all devices may not always result in the best performance of the storage system. This is especially true for workloads having high variance in the I/O request sizes, e.g., a workload with requests as small as a few KBs in size and requests as large as a few GBs in size.

Therefore, present inventors have explored a new approach and devised new solutions, which are based on subtier-level data assignment. Such solutions are described in detail in the following. They can be applied to data assignment across a homogenous set of devices (i.e., a set of storage devices with the same characteristics, i.e., within a given tier of a tiered storage system), as well as across a heterogeneous set of devices (i.e., across several tiers of the system).

The following description is structured as follows. First, general embodiments and high-level variants are described (sect. 1). The next section addresses more specific embodiments and technical implementation details (sect. 2).

1. General Embodiments and High-level Variants

Figure 4:
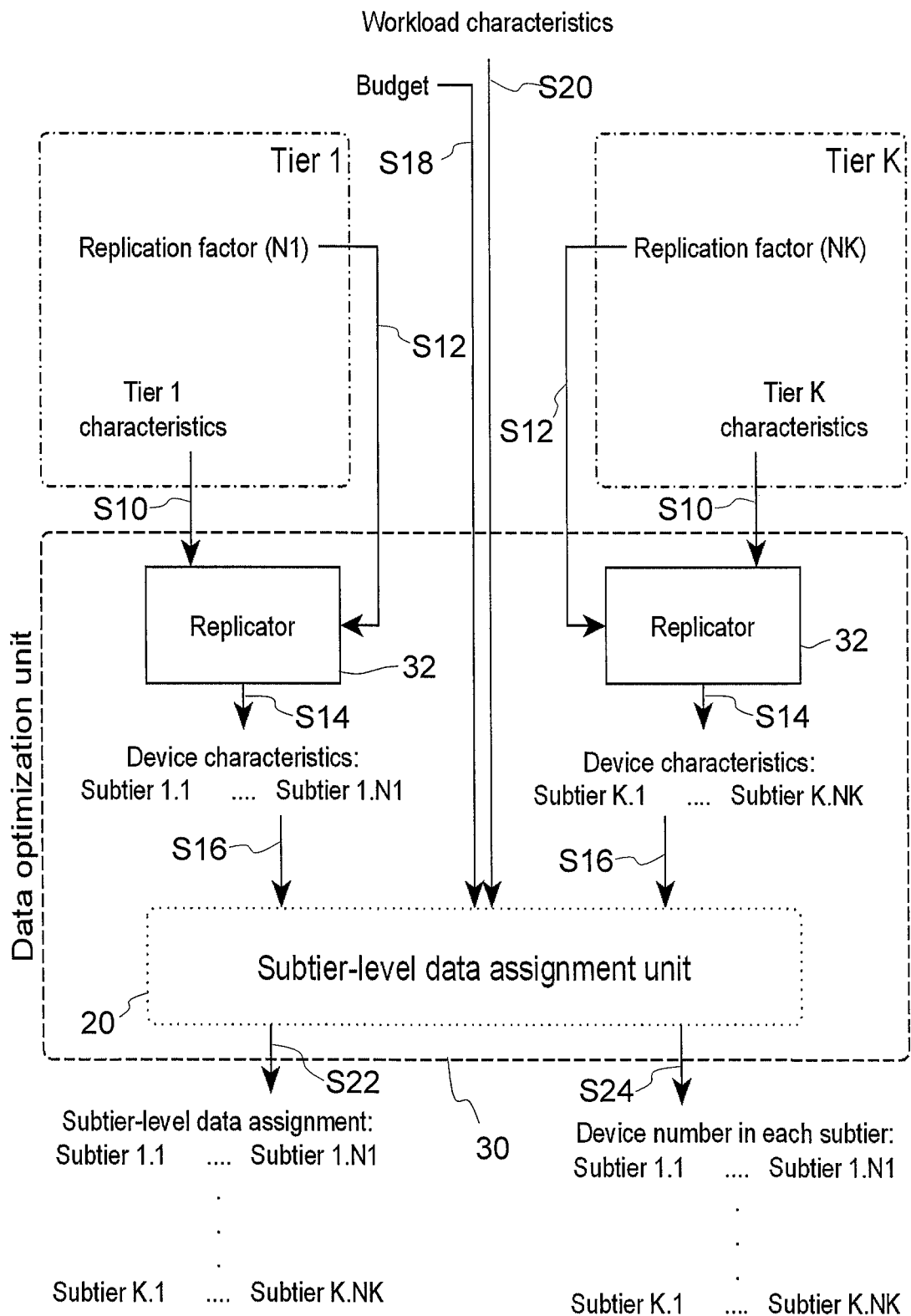
FIG. 4 is a flowchart illustrating high-level steps implemented by a data optimization unit as in FIG. 3, for determining subtier-level data assignments across a plurality of tiers of a tiered storage system, according to a first class of embodiments (also referred to as "flat approach" in this document)
Figure 5:
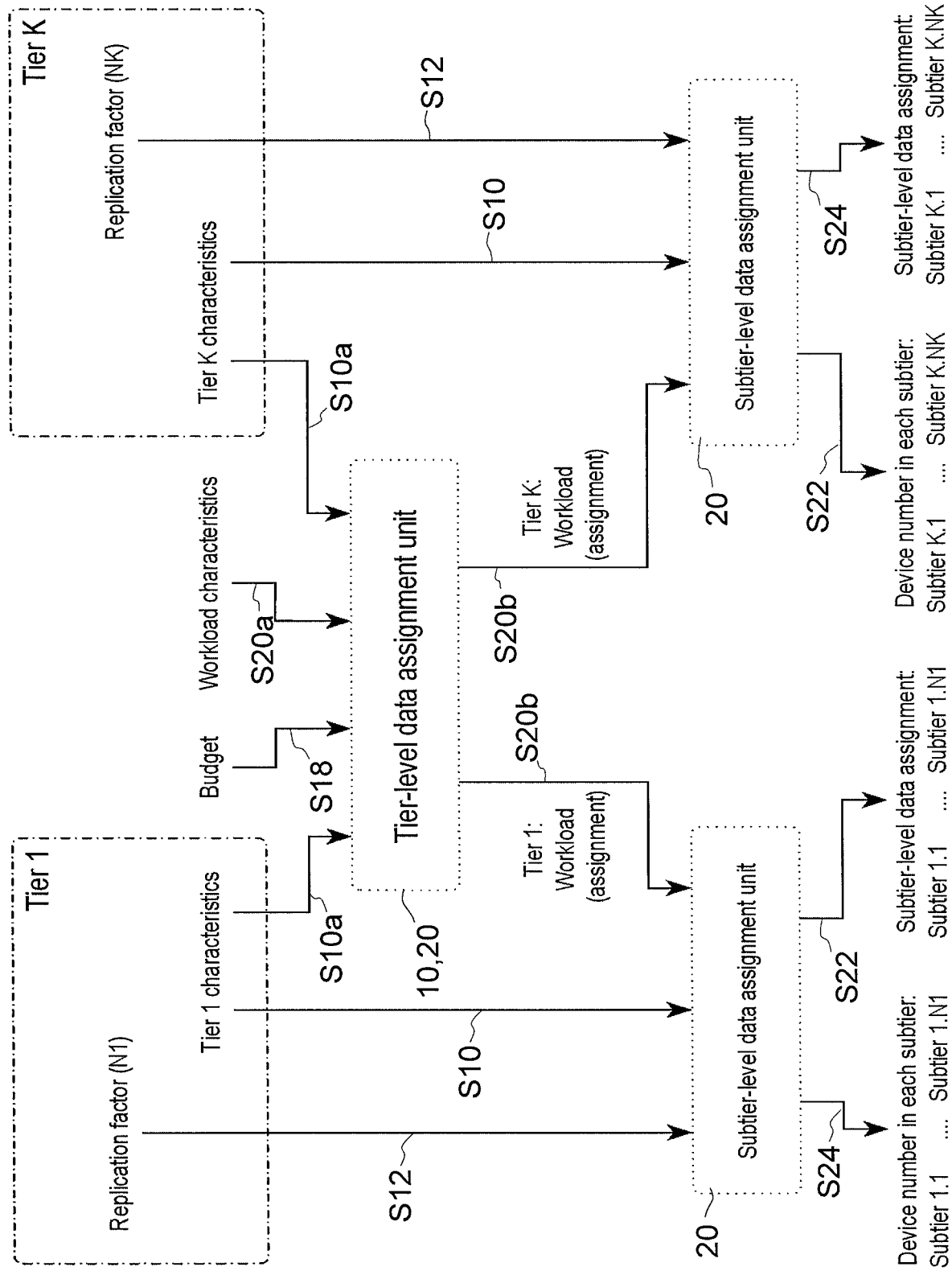
FIG. 5 is a flowchart illustrating a variant to FIG. 4, involving nested data assignment steps across tiers and subtiers (also referred to as "nested approach" herein)
Figure 6:
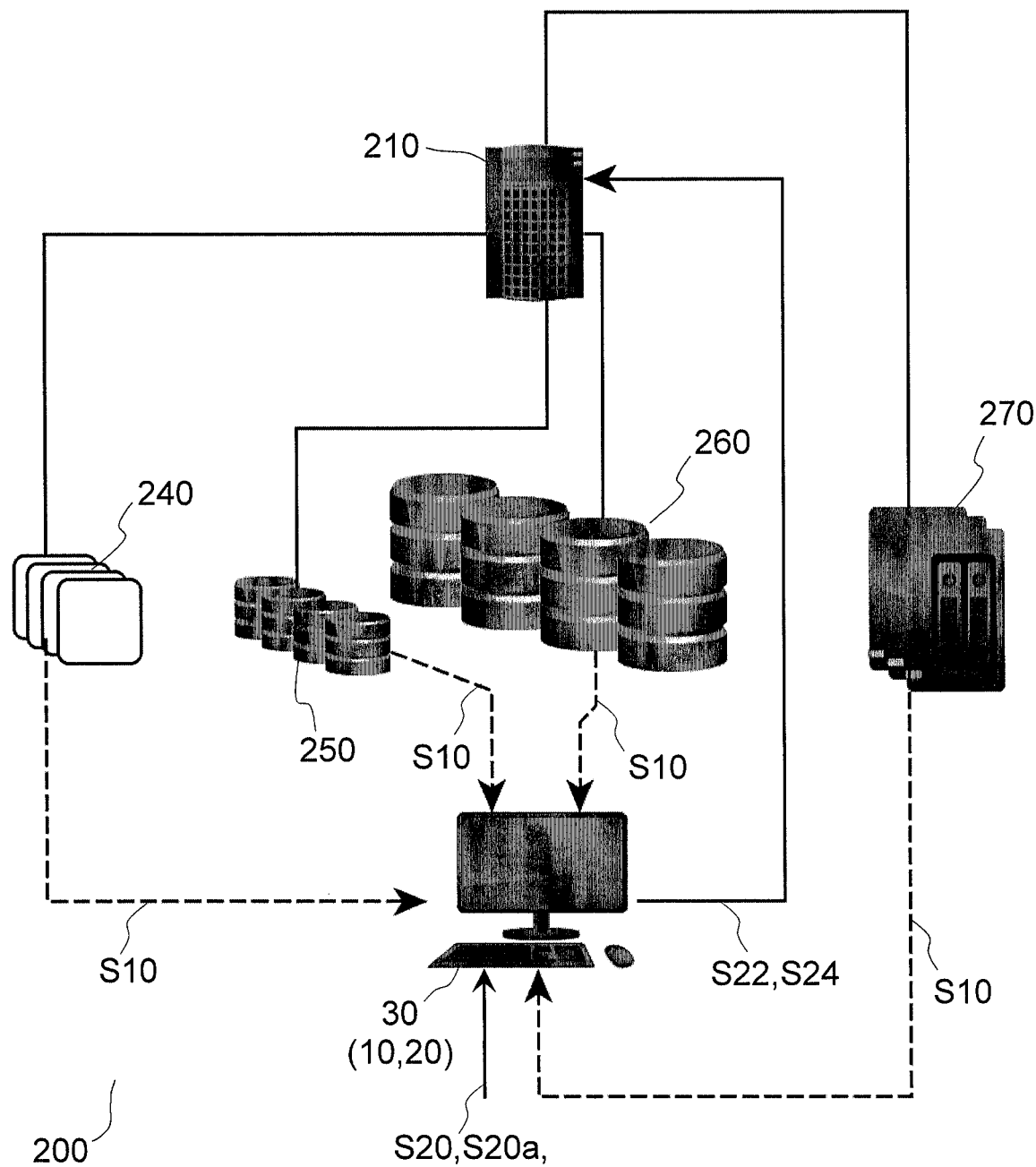
FIG. 6 schematically represents a tiered storage system, involving a data optimization unit (or module) for implementing method steps according to embodiments of the invention.

In reference to FIGS. 2-5 and 6, an aspect of the invention is first described, which concerns methods for determining an assignment of data. The data are meant to be stored on a tiered storage system 200, such as depicted in FIG. 6. The present approach can be used to determine data assignment within (and possibly across) one or more storage tiers of a plurality of storage tiers 240, 250, 260, 270 of the system 200.

Tiered storage system are known per se. A tier is a homogenous collection of storage devices of a same kind, having all similar if not identical storage characteristics. The system 200 depicted in FIG. 6 involves several tiers of storage media, e.g., SSD devices 240, high-end disks 250, low-end disks 260 or any other kind of storage devices 270 like tape drives.

Consider first a given storage tier i, which can be any tier (low- or high-performance), for which improvement of performance is sought. To that aim, the present methods first comprise accessing S10 storage device characteristics of that storage tier i, also referred to as "tier characteristics", for simplicity. The storage device characteristics of a given tier i are device characteristics of storage devices in that tier, which devices are typically identical and at least of a same kind. More generally, embodiments described herein assume that the same assumption holds true for each tier, e.g., HDD, SDD, etc. I.e., storage devices within each tier are typically identical and at least of a same kind, as assumed in FIG. 6.

The characteristics of the storage devices accessed at step S10 may for instance include: a storage capacity; a bandwidth for servicing requests on the storage device; and/or a seek time. Reasons for doing so are discussed in US2016048355. In the present context, however, such characteristics are used to optimize data assignment to subtiers within a same tier, as explained below. As depicted in FIG. 6, the storage device characteristics (as accessed at step S10) may be obtained directly from the devices of each tier 240-270. In variants, such characteristics may be provided by controllers (not shown) in each tier, or by a storage server 210, etc.

Figure 2:
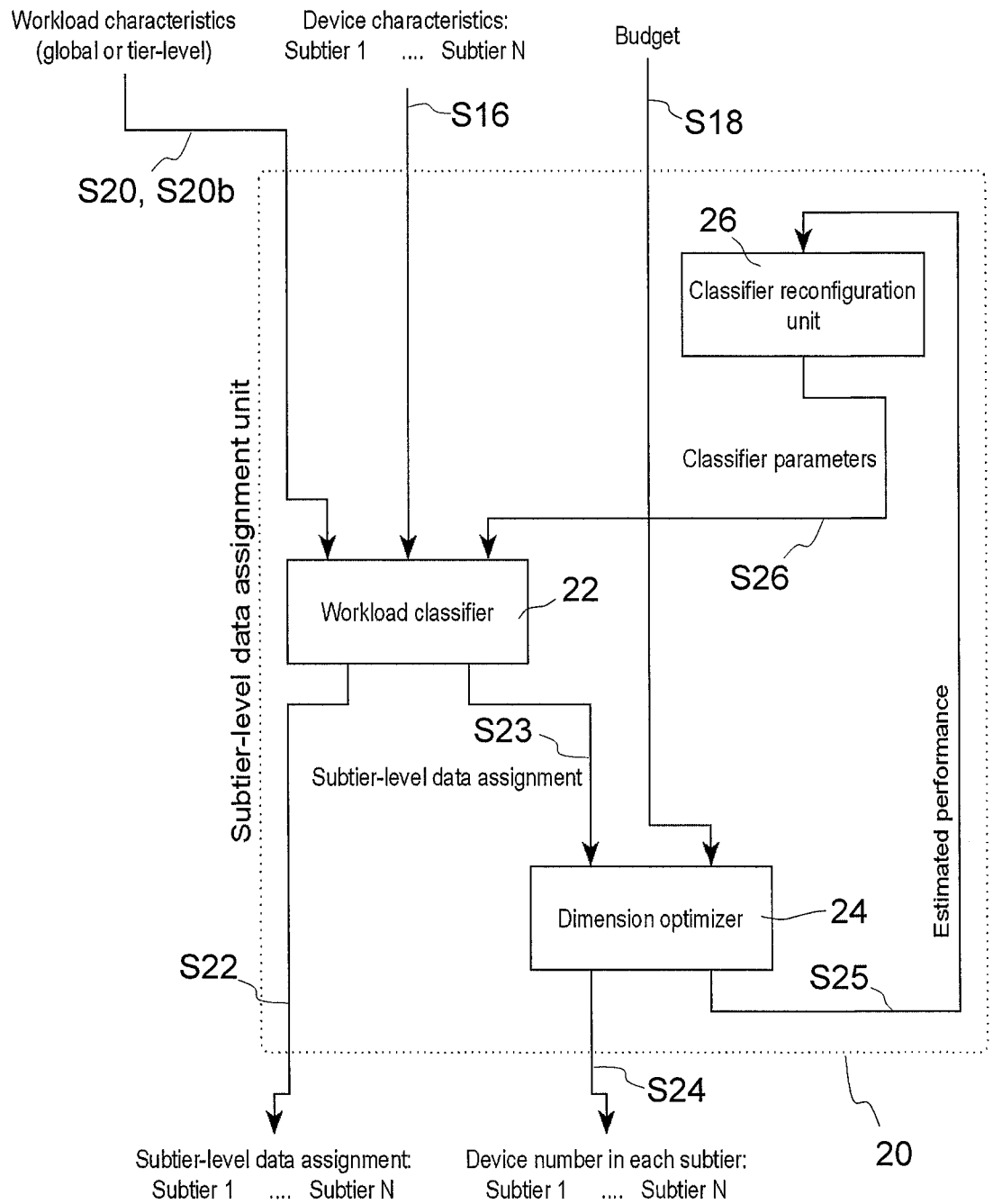
FIG. 2 depicts a flowchart illustrating high-level steps implemented by a subtier-level data assignment unit (or module) for determining a subtier-level data assignment, as involved in embodiments.

Next, based on the accessed S10 storage device characteristics, the tier i is virtually split S14 into $N_i$ storage subtiers. The resulting subtiers have respective storage device characteristics. The latter may for instance be provided at step S16, e.g., to a subtier-level data assignment unit (or module) 20, for it to subsequently determine a data assignment for data across the subtiers of tier i, as depicted in FIG. 2. We note that step S14 is facilitated if performed under the constraint that each of the resulting storage subtiers be composed of storage devices having identical storage characteristics, which simplifies the splitting operation. That is, storage devices assigned to a given tier may all be identical, as noted earlier.

The unit (or module) 20 then basically determines S23, S25, S26, S22 the assignment (or placement) of data to be stored on each of the $N_i$ storage subtiers, based on (i) characteristics S20, S20a, S20b of data to be stored on the system 200 and (ii) the respective storage device characteristics S16 of the $N_i$ storage subtiers. That is, characteristics of data to be stored are reconciled with characteristics of the subtiers, in order to determine a suitable data assignment. Iterative procedures can advantageously be used, as discussed below. Again, considerations already mentioned in US2016048355 can advantageously be reused here, except they are now applied at subtier-level. To that aim, an additional step S14 is needed, in order to determine subtiers and characteristics thereof.

"Data assignment" as used herein is synonymous with "data placement". It refers to a policy (or scheme) that determines where (i.e., in which subtier of which tier) data of specified types must be stored. Note that the data assignments accordingly determined may be indicative only: in that case, the storage algorithm as implemented at runtime (e.g., by a server 210) would accordingly try to enforce this scheme or policy as possible when actually storing the data. In variants, data assignments as determined herein may be strictly enforced by a storage system. In that respect, the present invention extends to methods and systems for actually storing data on subtiers of storage tiers 240, 250, 260, 270 of a tiered storage system 200, according to storage subtiers as obtained after step S14 and the data assignments as determined according to step S22 (or steps S23, S25, S26, S22).

The characteristics of the data to be stored may in general relate to workload and, in general, will include one or more of the following characteristics: data unit sizes, average request sizes, and average request rates. Data units can be characterized by their size, the rate of data requests read or write to such data units, the average value and distribution of the sizes of data request to such data units, and the sequencing of the requests. Data workload relates to the amount of work to be done by the storage system. Workload may involve a set of data units and their characteristics that need be handled by the storage system 200.

In addition to observing and characterizing existing workloads, workloads can also be predicted, forecasted, or synthetic workloads can be created, simulated, or modelled for the storage system design and performance evaluation purposes. The workload can be used as part of the first set of parameters. A dynamically estimated or collected workload may be relied on, to improve the data assignment, which may be dynamically adapted too. For example, in embodiments, workload statistics can be dynamically collected S10 in the tiered storage system 200. Dynamically collected workload statistics may form part of the characteristics of data to be stored, as used for determining subtier-level data assignment (and possibly device numbers, as discussed later).

Thus, the present approach provides data-to-subtier assignment, i.e., it determines data assignment at subtier-level, instead of directly and solely applying a load-balancing algorithm to determine data placement within each tier, as proposed in prior art approaches. Implementing a subtier data assignment scheme as proposed herein happens to improve system performances, as Inventors have realized, especially where the data to be stored have substantial variance in terms of request sizes.

As said earlier, prior methods are known, which use a load-balancer to determine, within each tier, data assignment across the devices in said each tier. A rationale for load balancing may for example be that maximal parallelism can be achieved, and thus performance is expected to be optimized, when the servers (e.g., disks) share the load equally. However, when the statistical characteristics of the workload (e.g., variability of job sizes and inter-arrival times) are taken into account, an equally balanced load may no longer be optimal for the purpose of optimizing performance as measured by the mean response time, as present Inventors have realized.

Therefore, to determine a better data assignment within each tier, the present approach is to create a number of subtiers for each tier, and determine a data-to-sub-tier assignment, which, e.g., maximizes a performance objective. For example, the performance objective may be to minimize the storage system's mean response time under a given workload) under a budget constraint (the budget is used to purchase and run said storage system). Thus, the present approach may advantageously replace a load balancing mechanism (within a tier) with a better optimized data assignment across the tier devices.

For example, present methods may be used on two subtiers with identical device characteristics, i.e., $N_i=2$, and then they would distribute data over the two subtiers in a non-trivial way (i.e., according to present data assignment schemes), compared with intra-tier load balancing mechanisms. And the present data assignment schemes may be devised so as to maximize a performance objective, e.g., so that the system's mean response time is minimized.

Various practical implementations can be contemplated at this point. For instance, a suitable algorithm may use a performance metric and an iterative procedure. Namely, after having determining a first (tentative) data assignment (see, e.g., step S23 in FIG. 2), a value of a performance metric may be estimated, step S25, based on the previously determined S23 assignment and a number of storage devices for each of the $N_i$ storage subtiers of a given tier i. Then, the data assignment determination can be iteratively refined S26, S23, S25, . . . , based on successively obtained values for the performance metric, e.g., until a termination condition is met (e.g., a convergence and/or a threshold value is achieved). Once a termination condition is met, a final data assignment is obtained at step S22, which can then be fed to a storage server 210, for it to effectively implement the data assignment scheme when effectively storing data on the tier i. Thus, the successively computed performance metric values can be regarded as feedback parameters that are used in a control loop.

During this iterative process S26, S23, S25, . . . , the number of devices of each subtier of the tier i may be taken into consideration. The latter may be imposed, or not. That is, the number of devices for each subtier may be optimized as well. For instance, referring to FIG. 2, present methods may determine, for each of the $N_i$ storage subtiers, a number of storage devices to form each subtier, based on a determined S23, S24 subtier-level assignment of data. If the number of storage devices is iteratively determined (in addition to the data assignment), then it is preferably determined, at each iteration, immediately after a previously determined S23 subtier-level assignment of data. In all cases, the number of storage devices as finally determined for each subtier is provided at step S24. Information obtained at step S24 can be fed to the storage server 210 or to a vassal tier controller, for it to effectively take account of this additional information when effectively storing data on the tier i.

The determination of the number of storage devices shall preferably take into account a budget constraint S18. The budget for the tiered storage system 200 may include a cost function, e.g., a global maximal cost, or a maximum number of storage devices available, etc. This constraint may apply to the whole storage system 200 or comprise a plurality of constraints, each applying to respective tiers.

Furthermore, the determination of the number of storage devices shall preferably take into account a performance metric, which can advantageously be the same as that used for determining the data assignment. For example, and as seen in FIG. 2, a value of a performance metric may be estimated S25 based on previously determined data assignment S23 (as determined by unit 22) and numbers of devices (for each of the $N_i$ storage subtiers, as determined by unit 24). From there, the process can be iterated S26, S23, S25, S26, . . . . Updated data assignments and numbers of devices are determined at each cycle, based on which a new value can be estimated S25 for the performance metric. This new value is then used to refine (via the unit 26) the determination of the data assignment and the number of devices for each subtier, and so on, as illustrated in FIG. 2. Once a termination is met, the iteration is stopped. The final data assignment (for each subtier) is provided at step S22 and the final number of devices (for each subtier) is provided at step S24.

The role and function of the unit 26 are described in US2016048355. A similar unit 26 (called "classifier reconfiguration unit") can be used here, except it is now used to adapt the assignment of data to subtiers, instead of tiers. Basically, the classifier reconfiguration unit 26 is here configured to update parameters and provide these to a reconfigurable classifier unit (not shown), for it to adapt the assignment of the data to the subtiers. This is discussed later in detail in reference to FIG. 6.

The scheme of FIG. 2 assumes that the number of devices per subtier is optimized. Meanwhile, the number of devices per tier may be imposed, or subject to optimization as well. In variants, the number of devices in each of the subtiers may be imposed, e.g., by a user. Various intermediate approaches are possible. For example, a user may impose constraints on the numbers of devices in each subtier. E.g., a largest subtier may have between 4 and 8 devices, while the smallest may have up to 4 devices only. There, a dimensioning unit 24 may determine optimal numbers of devices given such constraints. In other variants, similar constraints might be obtained thanks to automatic methods.

In embodiments, the subtier-level assignment of data is determined S22 so as for the $N_i$ storage subtiers to comprise data having most similar request sizes. To that aim, one may categorize the types of data according to their expected request sizes. Then, the assignment of data can be determined S22 so as for the $N_i$ storage subtiers to comprise data having most similar request sizes. This, in turn, allows the variance of request sizes to be lowered in each subtier, which results in better performances, as Inventors have realized. Indeed, and as noted earlier, balancing load may be suboptimal because assigning files with large request sizes (e.g., few GBs) and files with small request size (e.g., few KBs) on a same device results in high variance of request sizes and queuing time linearly increases with the variance of request size. This problem can be mitigated by placing files with similar request sizes on the same devices. To achieve this, the present methods will identify what data types have similar request sizes and to which devices to assign them, when reconciling characteristics S20, S20a, S20b of the data to be stored on the tiered storage system 200 and the storage device characteristics S16 of the $N_i$ storage subtiers.

Figure 3:
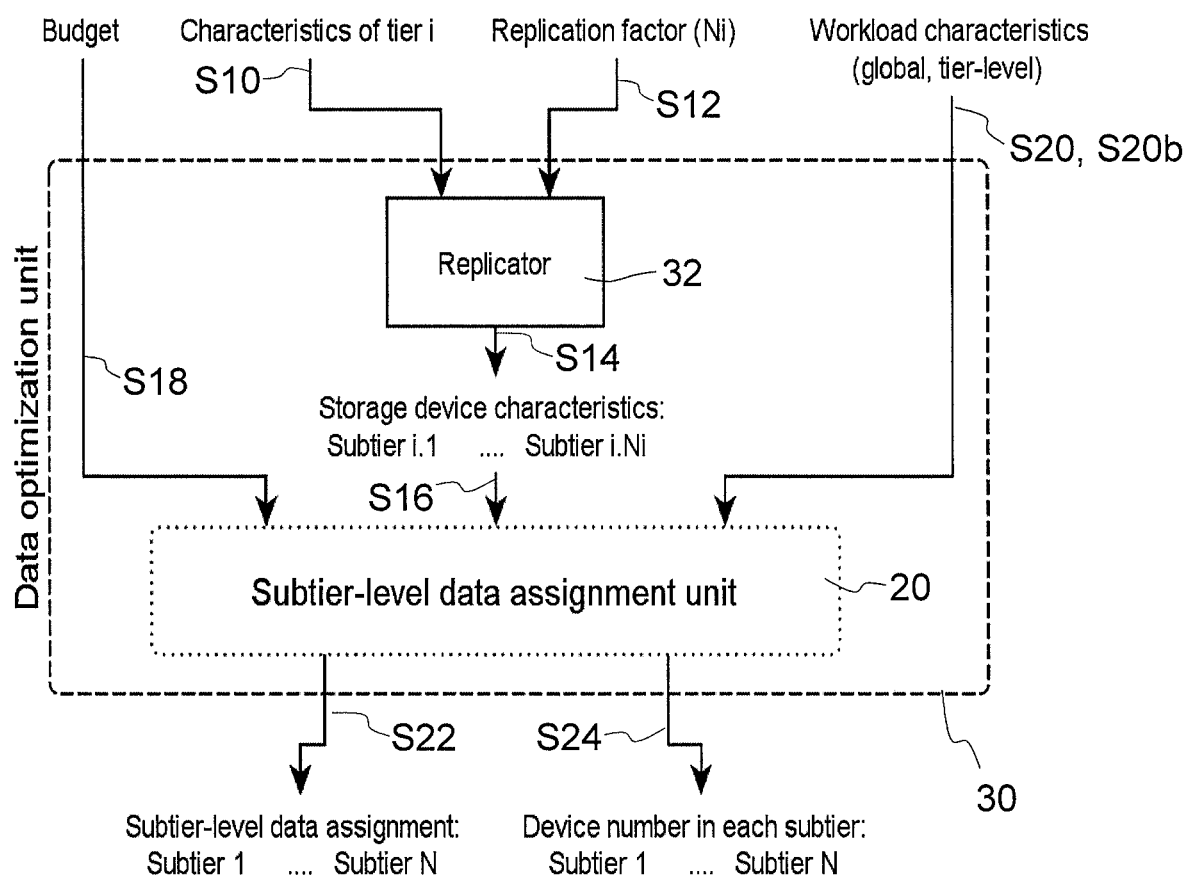
FIG. 3 is a flowchart illustrating the basic operation of a data optimization unit (or module) involving a replicator and a subtier-level data assignment unit (or module) as in FIG. 2, according to embodiments.

As illustrated in FIGS. 3-5, the present methods may, in embodiments, further comprise a step of accessing S12 a replication factor (or split factor). The latter defines a maximal number of (available) storage subtiers for a given storage tier i. This maximal number may depend on a maximal number of devices allowed for that tier (should this information be available, e.g., based on a budget constraints or cost function), inasmuch as the maximal number of storage subtiers cannot exceed the maximal number of devices allowed. In that case, the subsequent step S14 (where a storage tier i is split into subtiers) is performed according to the accessed replication factor. If all the devices of the storage tier i are identical (or at least have the same storage characteristics), then step S14 merely amounts to replicate the storage device characteristics as obtained from step S10 according to the replication factor.

The subtier-level data assignment unit 20 may subsequently arrive at a solution, which for a given tier i, indeed exploits the maximal number of subtiers allowed for that tier i, as defined by the replication factor. This, however, may not always be the case, as the algorithm of unit 20 may arrive at a solution where the effective number of subtiers to which data is to be assigned may simply be less than the maximal number of subtiers allowed by the replication factor.

In simple implementations, the replication factor is fixed by a user. More sophisticated variants may, however, be contemplated, as discussed below. In particular, the maximal number of storage subtiers allowed for one or more of the storage tiers may be subject to a prior optimization. The latter may for instance be based on the accessed S10 storage device characteristics and on the characteristics of the data to be stored. In such a case, the subsequent splitting S14 is performed according to the optimized number of storage subtiers. Yet, the iterative procedure described in reference to FIG. 2 may arrive at an effective number $N_i$ of storage subtiers that is less than the maximal number of allowable storage subtiers.

In embodiments, the characteristics of data to be stored comprise global workload characteristics, i.e., characteristics of the data to be globally stored on the tiered storage system 200. In variants, tier-level workload characteristics may be available. The present data assignment (and device number) determination processes may take global and/or tier-level characteristics into account.

For instance, the iterative process S23, S25, S26, . . . S22/S24 described in reference to FIG. 2 may be performed using global and/or tier-level workload characteristics. Yet, and as we shall see now, direct or indirect use may be made of global workload characteristics. Namely, in a first class of embodiment (flat approach), global workload characteristics are directly fed as input to the subtier-level data assignment unit 20 of FIG. 2. This case is depicted in FIG. 4. In a more sophisticated approach, indirect use is made of global workload characteristics. Namely, data assignment functions are first used to determine tier-level workloads and, if necessary, tier-level data assignments too, which are then used to determine subtier-level data assignment (nested approach). This variant is illustrated in FIG. 5. The embodiments of FIGS. 4 and 5 may use one or more data assignment units 10, 20, as depicted in FIGS. 1 and 2. In FIG. 4, the subtier-level data assignment unit 20 forms part of a data optimization unit 30, operated as illustrated in FIG. 3.

Referring first to FIGS. 2-4 in combination: step S14 (where a storage tier i is split into $N_i$ storage subtiers) may, in embodiments, be performed independently from global workload characteristics. I.e., the replicator 32 determines subtiers before global workload characteristics are fed to the data assignment unit 20. Then, the iterative determination S23, S25, S26, . . . S22(S24) of data assignment (and device numbers) is performed according to global workload characteristics, as accessed at step S20. In that case, global workload characteristics are reconciled with subtier characteristics (as obtained at step S14 from tier characteristics obtained at step S10), to determine optimal data assignment S22 and device numbers S24.

Despite its simplicity, this embodiment can be used to determine heterogeneous storage system configurations and data assignment that improve the system performance significantly. However, it also becomes computationally intensive as the numbers of subtiers allowed for the tiers increase.

Referring now to FIG. 5, the present methods may, in embodiments, further comprise an intermediate determination step S20b, to determine tier-level workload characteristics of data to be stored on each storage tier i. Step S20b is performed based on the global workload characteristics S20a and tier-level device characteristics as obtained at step S10a. Next, the iterative scheme S23, S25, S26, . . . S22/S24 of FIG. 2 is implemented by unit 20, according to the tier-level workload characteristics as accessed at step S20b for a given storage tier i.

As further seen in FIG. 5, the intermediate determination step may, in embodiments, further comprise determining a tier-level data assignment, i.e., to determine what types of data are to be stored on each storage tier i. To that aim, use is made of global workload characteristics (accessed at step S20a) and the tier-level device characteristics (as accessed at step S10a), e.g., consistently with the scheme of FIG. 1. Even, an optimal number of devices may be identified for each tier. Accordingly, the subsequent determination steps S22, S24 (to determine subtier-level data assignment and device numbers) can make use of all the tier-level information available (e.g., workload characteristics, data assignment and device numbers).

The variant of FIG. 5 allows a pre-assignment (on tier level) of data and avoids subtiers to compete for larger data sets (i.e., subtiers compete for restricted, tier-level data sets). Operations performed at tier-level need not be redone at subtier-level.

As noted above, a unit 10 (FIG. 1) may be used to perform the tier-level pre-assignment, while a subtier-level data assignment unit 20 (FIG. 2) may be used for subtier-level operations. Yet, and as it may further be realized, a same data assignment unit (or module) 20 may be used to perform both the intermediate determination step S20b (e.g., to determine tier-level workload, data assignments) and the subtier-level optimization, i.e., steps S23, S25, S26, . . . S22/S24 of FIG. 2, as the core algorithms needed can be identical, in embodiments. Thus, a nested implementation of the unit/module 20 may be relied upon in that case.

The computational complexity of one module or unit 20 depends on the number of (sub)tiers it receives as input. The number of (sub)tiers as input to any single module or unit 20 is limited to the replication factor (which determines the maximal number of subtiers that the system may allow in given one or more tiers) or the number of distinct tiers, whichever is larger. In the "flat approach", FIG. 4, the number of (sub)tiers the module or unit 20 receives as input is equal to the sum of the replication factors (for all tiers). Therefore, one understands that the "nested approach" of FIG. 5 has a computational advantage over the "flat approach" of FIG. 4. For example, when $N_1 = N_2 = \ldots = N_K = N$, the computational complexity of the nested approach is $O(2^N + N*(2^K))$ whereas the complexity of the flat approach is $O(2^{(N*K)})$.

A comparison of performance between prior art methods (using perfect load balancing), the flat approach of FIG. 4, and the nested approach of FIG. 5 was done by the present Inventors, who concluded that embodiments of the present methods may outperform prior methods by substantially decreasing the I/O read requests mean response time of the system, e.g., by a factor of 3.6.

So far, the present methods have essentially been described in reference to a given tier i. However, and as explicitly shown in FIGS. 4, 5 and 6, embodiments of such methods shall typically apply the same principles to a plurality of tiers, concurrently. This way, subtier-level data assignments (and device numbers) may concurrently be determined for two or more, or for each of the plurality of storage tiers 240, 250, 260, 270 of the tiered storage system 200. In particular, steps S10, S14, S22 (S23, S25, S26, S22) and S24 (S25, S26, S23, S24) may be performed for each of storage tiers considered.

Referring to FIG. 6: according to another aspect, the invention can be embodied as a tiered storage system 200. The latter notably comprises a data assignment unit (or module) 20 for determining subtier-level assignments of data in one or more storage tiers of a plurality of storage tiers 240, 250, 260, 270 thereof. This data assignment unit 20 is generally configured to perform data steps according to the computerized methods described herein (and in particular steps S10, S14 and S22). As noted earlier, the same data assignment unit (or module) 20 may be used to perform nested data assignment steps S20b, S23-S22, as discussed earlier in reference to FIG. 5. The tiered storage system may further be configured to determine S23-S24 optimal numbers of devices for all subtiers (of one or more of the tiers).

To that aim, and as illustrated in FIG. 6, the system 200 may comprise a server 210, in data communication with storage devices of various tiers 240-270, and with units 10-30 of FIGS. 1-3, though the latter are preferably aggregated into one unit or module (such as a processor, for example), which may actually be part of the server 210 or computerized methods thereof.

For example, in specific embodiments, the data assignment unit 20 may comprise a reconfigurable classifier unit (not shown), a dimensioning unit 24, and a classifier reconfiguration unit 26. In preferred embodiments, the units/modules 24-26 interoperate as follows.

The reconfigurable classifier unit receives two sets of parameters. The first set of parameters comprises characteristics of the data to be stored and characteristics of the storage devices. The second set of parameters comprises classifier unit configuration parameters. The reconfigurable classifier unit can thus determine assignments of data to the plurality of storage subtiers (and possibly to the tiers as well, in addition), based on the two sets of parameters, according to principles discussed earlier in reference to FIG. 2.

The dimensioning unit 24 may for instance determine optimal numbers of storage devices for subtiers (and possibly tiers as well) based on: a previously determined data assignment, a cost value, and a performance metric. The unit 24 shall furthermore estimate a value of the performance metric based on a previously determined data assignment and the number of storage devices it determines based thereon. The classifier reconfiguration unit 26 can then determine (updated) parameters (namely pertaining to the second set) and provides updated parameters to the reconfigurable classifier unit. The latter then adapts the data assignment based on the first set of parameters and the second set of parameters.

The reconfigurable classifier unit is typically configured to perform a utility function based on the two sets of parameters. The reconfigurable classifier unit may for instance assign each data unit to a storage subtier for which a maximum value of the utility function is obtained. The utility function shall typically include at least a term representing costs for storing one data unit and a term representing the load this data unit provides to the storage subtier.

The reconfigurable classifier unit, the dimensioning unit and the classifier reconfiguration unit accordingly provide a control loop for determining the data assignment and optimize the device numbers. The classifier reconfiguration shall preferably be in charge of determining whether the estimated performance metric fulfills a termination condition of the control loop.

Identical storage devices or at least having identical storage characteristics may be used in each subtier, and preferably throughout a corresponding tier.

According to a final aspect, the invention can be embodied as a computer program product. The latter comprises a computer readable storage medium having program instructions embodied therewith. The program instructions are executable by one or more processors of one or more computerized entities, to cause to implement steps according to the present methods. This will be discussed in more detail in section 2.2.

The above embodiments have been succinctly described in reference to the accompanying drawings and may accommodate a number of variants. Several combinations of the above features may be contemplated. Examples are given in the next section.

2. Specific Embodiments/Technical Implementation Details 2.1 Computerized (Storage) Systems Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used, e.g., to implement functions/steps of elements 10-30 and 210.

Figure 7:
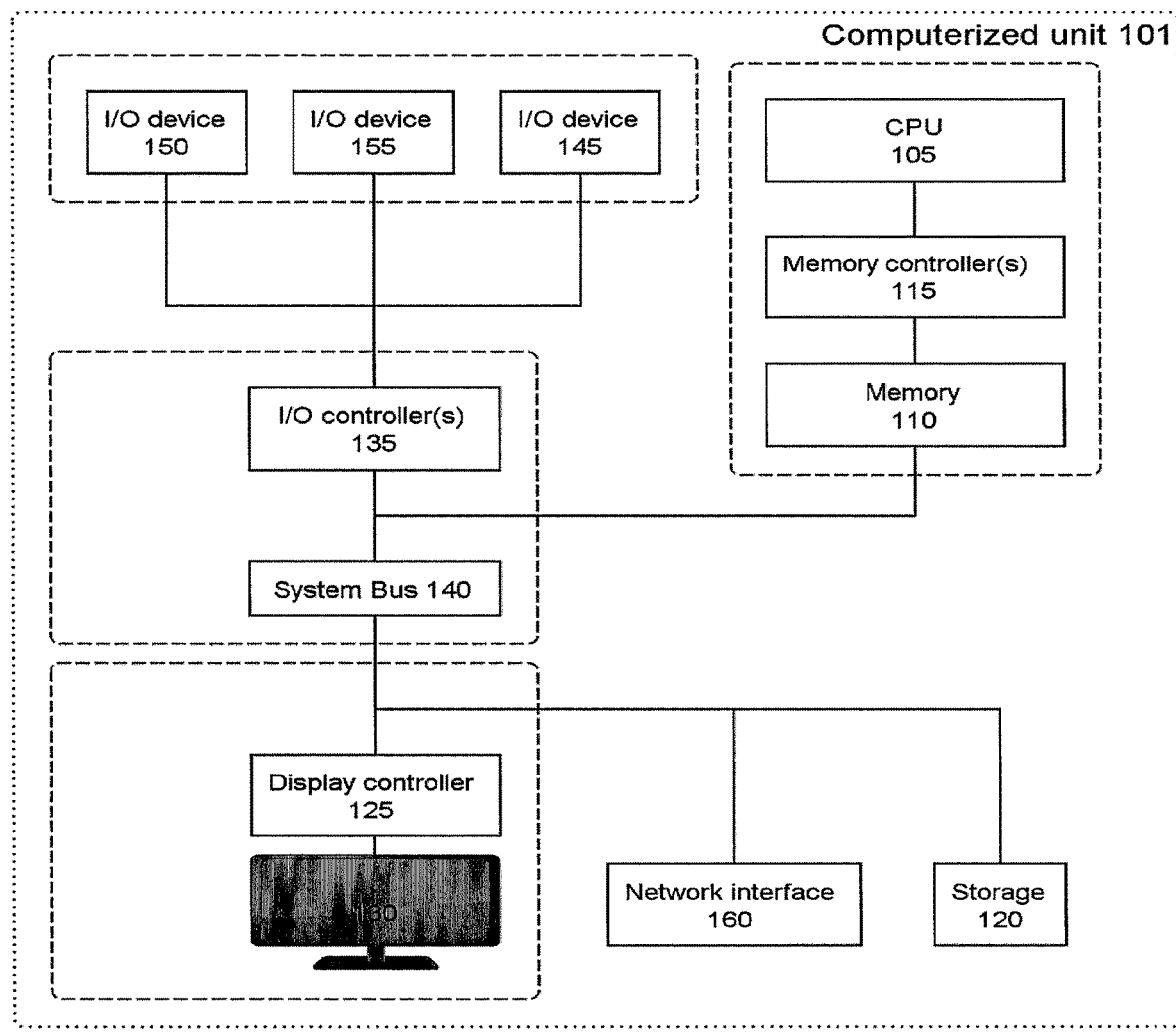
FIG. 7 schematically represents a general purpose computerized system, suited for implementing one or more method steps as involved in embodiments of the invention.

For instance, the computerized system depicted in FIG. 7 schematically represents a computerized unit 101, e.g., a general-purpose computer, which may form part or all of the element 210 (a storage system computerized server) shown in FIG. 6. The same architecture may be used for the elements 10, 20, 30, i.e., (sub)tier-level data assignment units, which may, in variants, form part of the element 210.

In exemplary embodiments, in terms of hardware architecture, as shown in FIG. 7, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. A system bus 140 may be present, in addition to the input/output controller 135.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 7, the software in the memory 110 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices.

In addition, the I/O devices 145-155 may further include devices that communicate both inputs and outputs. The computerized system can further include a display controller 125 coupled to a display 130. In exemplary embodiments, the computerized system can further include a network interface or transceiver 160 for coupling to a network 165.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

2.2 Computer Program Products

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute, on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method comprising:
accessing storage device characteristics of at least one storage tier i of a plurality of storage tiers within a tiered storage system;
based on the accessed storage device characteristics, splitting said at least one storage tier i into $N_i$ storage subtiers of said at least one storage tier i, said $N_i$ storage subtiers having respective storage device characteristics, wherein each storage subtier is a set of physical devices;
based on characteristics of data to be stored on the tiered storage system and the respective storage device characteristics of the $N_i$ storage subtiers, determining an assignment of data to be stored on each of the $N_i$ storage subtiers; and
storing data on each of the $N_i$ storage subtiers according to the determined assignment of data.

2. The method according to claim 1, wherein the method further comprises:
estimating a value of a performance metric based on: the determined assignment of data to be stored on each of the $N_i$ storage subtiers; and a number of storage devices for said each of the $N_i$ storage subtiers,
and wherein,
determining the assignment of data to be stored on each of the $N_i$ storage subtiers is iteratively performed based on one or more values as estimated for said performance metric.

3. The method according to claim 1, wherein the method further comprises:
determining, for each of the $N_i$ storage subtiers, a number of storage devices to form said each of the $N_i$ storage subtiers, based on a determined assignment of data to be stored on each of the $N_i$ storage subtiers.

4. The method according to claim 3, wherein the method further comprises:
estimating a value of a performance metric based on: the determined assignment of data to be stored on each of the $N_i$ storage subtiers; and the number of storage devices to form said each of the $N_i$ storage subtiers,
wherein determining the assignment of data to be stored on each of the $N_i$ storage subtiers and determining the number of storage devices to form said each of the $N_i$ storage subtiers are iteratively performed based on one or more values as estimated for said performance metric.

5. The method according to claim 1, wherein
said assignment of data is determined so as for the $N_i$ storage subtiers to comprise data having most similar request sizes.

6. The method according to claim 1, wherein
characteristics of data to be stored comprise global workload characteristics of the data to be globally stored on the tiered storage system and determining the assignment of data is performed based on such global workload characteristics.

7. The method according to claim 6, wherein
splitting said at least one storage tier i into $N_i$ storage subtiers is performed independently from said global workload characteristics and determining the assignment of data is performed according to such global workload characteristics.

8. The method according to claim 6, wherein
the method further comprises an intermediate determination step, which comprises determining tier-level workload characteristics of data to be stored on said at least one storage tier i, based on:
said global workload characteristics; and
storage device characteristics of said at least one storage tier i,
and wherein,
determining the assignment of data to be stored on each of the $N_i$ storage subtiers of said at least one storage tier i is performed according to the tier-level workload characteristics determined for said at least one storage tier i.

9. The method according to claim 8, wherein
the intermediate determination step further comprises determining a tier-level data assignment of data to be stored on said at least one storage tier i based on:
said global workload characteristics; and
the storage device characteristics of said at least one storage tier i,
and wherein,
determining the assignment of data to be stored on each of the $N_i$ storage subtiers of said at least one storage tier i is performed according to both the tier-level workload characteristics and the tier-level data assignment determined for said at least one storage tier i.

10. The method according to claim 9, wherein
a same data processor is used to perform said intermediate determination step and said step of determining the assignment of data to be stored on each of the $N_i$ storage subtiers of said at least one storage tier i.

11. The method according to claim 1, wherein
the method further comprises accessing a replication factor that defines a maximal number $N_i$ of storage subtiers for said at least one storage tier i,
and wherein,
splitting said at least one storage tier i is performed according to the accessed replication factor.

12. The method according to claim 1, wherein
the method further comprises determining a number $N_i$ of storage subtiers for said at least one storage tier i, based on the accessed storage device characteristics of said at least one storage tier i and based on said characteristics of data to be stored,
and wherein,
splitting said at least one storage tier i is performed according to the determined number $N_i$ of storage subtiers.

13. The method according to claim 1, wherein
splitting said at least one storage tier i into $N_i$ storage subtiers is performed under a constraint that each of the resulting storage subtiers be composed of storage devices having identical storage device characteristics.

14. The method according to claim 1, for determining an assignment of data to be stored on two or more of the plurality of storage tiers of the tiered storage system, wherein
the accessing storage device characteristics, splitting and determining an assignment of data are performed for each of the two or more of the storage tiers.

15. The method according to claim 1, wherein
said characteristics of data to be stored include at least one of a data unit size, an average request size, and an average request rate.

16. The method according to claim 1, wherein the method further comprises
dynamically collecting workload statistics in the tiered storage system, the characteristics of data to be stored including the collected workload statistics.

17. The method according to claim 1, wherein
the storage device characteristics include at least one of a storage capacity, a bandwidth for servicing requests, and a seek time.

18. An apparatus comprising:
at least one processor; and
at least one non-transitory memory including computer program code, the at least one memory and the computer program code configured to, with the at least one processor, cause the apparatus at least to:
access storage device characteristics of said at least one storage tier i of a plurality of storage tiers within a tiered storage system;
based on the accessed storage device characteristics, split said at least one storage tier i into $N_i$ storage subtiers of said at least one storage tier i, said $N_i$ storage subtiers having respective storage device characteristics, wherein each storage subtier is a set of physical devices;
based on characteristics of data to be stored on the tiered storage system and the respective storage device characteristics of the $N_i$ storage subtiers, determine an assignment of data to be stored on each of the $N_i$ storage subtiers; and
store data on each of the $N_i$ storage subtiers according to the determined assignment of data.

19. A computer program product comprising a computer readable storage medium having program instructions embodied therewith, the program instructions being executable by one or more processors of one or more entities, to cause the computer program product to:
access storage device characteristics of at least one storage tier i of a plurality of storage tiers within a tiered storage system;
based on the accessed storage device characteristics, split said at least one storage tier i into $N_i$ storage subtiers of said at least one storage tier i, said $N_i$ storage subtiers having respective storage device characteristics, wherein each storage subtier is a set of physical devices;
based on characteristics of data to be stored on the tiered storage system and the respective storage device characteristics of the $N_i$ storage subtiers, determine an assignment of data to be stored on each of the $N_i$ storage subtiers; and
store data on each of the $N_i$ storage subtiers according to the determined assignment of data.

* * * * *